US011923611B2

(12) United States Patent
Hu

(10) Patent No.: US 11,923,611 B2
(45) Date of Patent: Mar. 5, 2024

(54) DUAL-FREQUENCY AND DUAL-POLARIZATION ANTENNA AND ELECTRONIC DEVICE

(71) Applicant: HONG FU JIN PRECISION INDUSTRY (WuHan) CO., LTD., Wuhan (CN)

(72) Inventor: Hsin-Nan Hu, New Taipei (TW)

(73) Assignee: HONG FU JIN PRECISION INDUSTRY (WuHan) CO., LTD., Wuhan (CN)

( * ) Notice: Subject to any disclaimer, the term of this patent is extended or adjusted under 35 U.S.C. 154(b) by 244 days.

(21) Appl. No.: 17/631,055

(22) PCT Filed: Apr. 26, 2021

(86) PCT No.: PCT/CN2021/089997

§ 371 (c)(1),
(2) Date: Jan. 28, 2022

(87) PCT Pub. No.: WO2022/226735

PCT Pub. Date: Nov. 3, 2022

(65) Prior Publication Data

US 2023/0208049 A1 Jun. 29, 2023

(51) Int. Cl.
*H01Q 21/24* (2006.01)
*H01Q 1/24* (2006.01)
*H01Q 5/28* (2015.01)

(52) U.S. Cl.
CPC ............. *H01Q 21/24* (2013.01); *H01Q 1/241* (2013.01); *H01Q 5/28* (2015.01)

(58) Field of Classification Search
CPC ...................................................... H01Q 9/065
(Continued)

(56) References Cited

U.S. PATENT DOCUMENTS 3,299,430 A * 1/1967 Huber .................... H01Q 9/065 343/873
7,095,373 B2 * 8/2006 Aikawa ................ H01Q 21/065 343/700 MS (Continued)

FOREIGN PATENT DOCUMENTS

CN 1929204 3/2007
CN 101005156 7/2007

(Continued)

*Primary Examiner* — Ricardo I Magallanes
*Assistant Examiner* — Brandon Sean Woods
(74) *Attorney, Agent, or Firm* — ScienBiziP, P.C.

(57) ABSTRACT

A dual-frequency and dual-polarization antenna for simultaneously transmitting and receiving dual-frequency 5G signals comprises: a first substrate; a first polarization antenna comprising a first radiation portion disposed on a first surface of the first substrate and a second radiation portion disposed on a second surface of the first substrate; a second polarization antenna comprising a third radiation portion disposed on the first surface of the first substrate and a fourth radiation portion disposed on the second surface of the first substrate; a second substrate located in a side of the second surface of the first substrate, a surface of the second substrate close to the first substrate is a copper-clad surface; and layout directions of the first polarization antenna and the second polarization antenna are orthogonal to each other in the first substrate. An electronic device comprising the dual-frequency and dual-polarization antenna is also provided.

18 Claims, 10 Drawing Sheets

100

(58) Field of Classification Search
USPC .......................................................... 343/893
See application file for complete search history.

(56) References Cited

U.S. PATENT DOCUMENTS

| | | | | |
|---|---|---|---|---|
| 8,228,235 B2 * | 7/2012 | Habib | .................... | H01Q 9/065 343/700 MS |
| 2010/0060526 A1 * | 3/2010 | Cheng | ...................... | H01Q 1/38 343/700 MS |
| 2018/0048074 A1 * | 2/2018 | Lilja | ...................... | H01Q 1/243 |
| 2022/0209398 A1 * | 6/2022 | Chiang | .................. | H01Q 21/08 |

FOREIGN PATENT DOCUMENTS

| | | |
|---|---|---|
| CN | 201699130 | 1/2011 |
| CN | 103682603 | 3/2014 |
| CN | 109103574 | 12/2018 |
| CN | 211858898 | 11/2020 |
| CN | 112582790 A * | 3/2021 |
| WO | 112582790 | 3/2021 |
| WO | 2021059661 | 4/2021 |

* cited by examiner

DUAL-FREQUENCY AND DUAL-POLARIZATION ANTENNA AND ELECTRONIC DEVICE

TECHNICAL FIELD

The subject matter herein generally relates to a field of communication technology, in particular to dual-frequency antennas with two polarizations and electronic devices.

BACKGROUND

In communication engineering, broadcast technology, radar technology, navigation technology, etc., radio wave signals can be transmitted through an antenna. The antenna is an important element of a wireless communication device, antenna technology has improved the development of science and technology.

At present, fifth-generation (5G) communication is fast, and relevant applications are also widely used. A main frequency band of 5G comprises a 28 GHz band and a 38 GHz band. In order to adapt the two frequency bands, an antenna transmitting and receiving the two frequency bands at the same time is required. Current antenna structures are dual-frequency antennas with single polarization or single-frequency antennas with two polarizations. Therefore, a dual-frequency and dual-polarization antenna needs to be provided to meet a new market requirement.

SUMMARY

In view of this, one aspect of the present application is to provide a dual-frequency and dual-polarization antenna, which may simultaneously transmit and receive multiple frequency bands of 5G signals.

A dual-frequency and dual-polarization antenna comprises: a first substrate; a first polarization antenna comprising a first radiation portion and a second radiation portion, the first radiation portion is disposed on a first surface of the first substrate, and the second radiation portion is disposed on a second surface of the first substrate; a second polarization antenna comprising a third radiation portion and a fourth radiation portion, the third radiation portion is disposed on the first surface of the first substrate, and the fourth radiation portion is disposed on the second surface of the first substrate; a second substrate is located in a side of the second surface of the first substrate, a surface of the second substrate close to the first substrate is a copper-clad surface; and layout directions of the first polarization antenna and the second polarization antenna are orthogonal in the first substrate.

In at least one embodiment, the dual-frequency and dual-polarization antenna further comprises a first radio frequency (RF) coaxial cable and a second RF coaxial cable, the first RF coaxial cable is electrically connected to the second radiation portion, and the second RF coaxial cable is electrically connected to the fourth radiation portion.

In at least one embodiment, the second substrate comprises a first via and a second via, the first RF coaxial cable passes through the first via, and the second RF coaxial cable passes through the second via.

In at least one embodiment, the first radiation portion comprises a first square portion and a first rectangular portion extended from a corner of the first square portion, and the second radiation portion comprises a second square portion.

In at least one embodiment, the third radiation portion comprises a third square portion, and the fourth radiation portion comprises a fourth square portion and a second rectangular portion extended from a corner of the fourth square portion.

In at least one embodiment, the third radiation portion comprises a convex portion, and the convex portion is disposed on a side of the third radiation portion close to the fourth radiation portion.

In at least one embodiment, the convex portion is an isosceles right triangle, a long side of the convex portion is attached to a side of the third radiation portion, and a length of the long side of the convex portion is less than a side length of the third radiation portion.

In at least one embodiment, the first RF coaxial cable and the second RF coaxial cable are electrically connected to a transceiver, and the transceiver is disposed on a surface of the second substrate away from the first substrate.

In at least one embodiment, a distance between the first substrate and the second substrate is 2.5 mm Another aspect of the present application provides an electronic device comprising the above-described dual-frequency and dual-polarization antenna.

Compared with the current technology, the dual-frequency antenna with two polarizations is designed in a form of eccentric feed-dipole antenna, which is able to receive dual-frequency signals at the same time, with low signal feed-loss and low assembly difficulty.

BRIEF DESCRIPTION OF THE DRAWINGS

Implementations of the present technology will now be described, by way of example only, with reference to the attached figures.

REFERENCE SIGNS OF MAIN ELEMENTS

Figure 1:
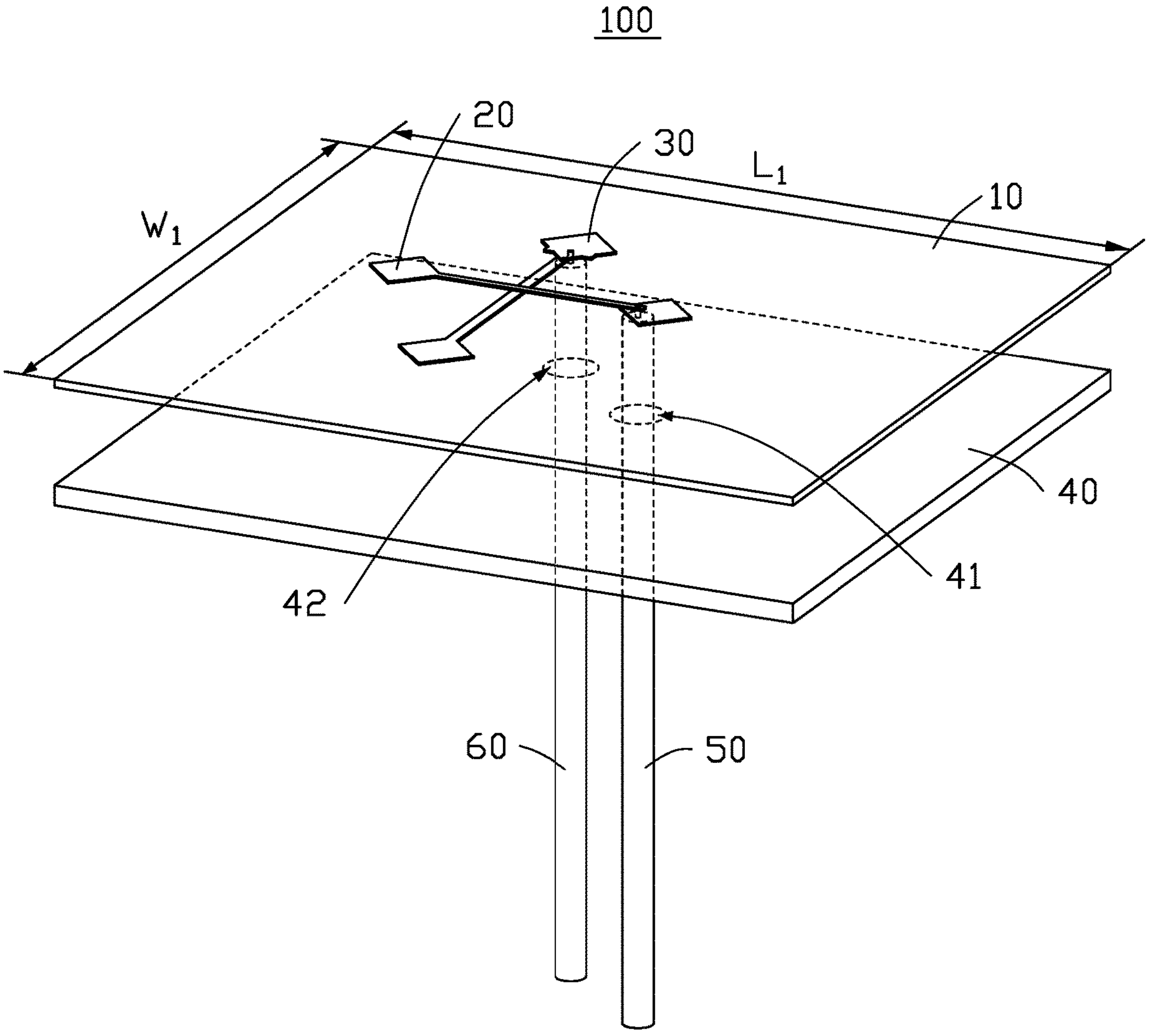
FIG. 1 is a front view of an embodiment of a dual-frequency and dual-polarization antenna according to the present disclosure.

Dual-frequency and dual-polarization antenna 100
First substrate 10
First polarization antenna 20

First radiation portion 21
First square portion 211
First rectangular portion 212
Second radiation portion 22
Second square portion 221
Second polarization antenna 30
Third radiation portion 31
Third square portion 311
Convex portion 312
Fourth radiation portion 32
Fourth square portion 321
Second rectangular portion 322
Second substrate 40
First via 41
Second via 42
First RF coaxial cable 50
Second RF coaxial cable 60
Transceiver 200

DETAILED DESCRIPTION

In order to understand the application, features and advantages of the application, and a detailed description of the application are described through the embodiments and the drawings. It should be noted that, the embodiments of the application and the features in the embodiments can be combined with each other.

While many details are described in the following descriptions, and the embodiments described are only part of the embodiments of the application, but not the entirety of embodiments.

Unless defined otherwise, all technical or scientific terms used herein have the same meaning as those normally understood by technicians in the technical field. The following technical terms are used to describe the application, the description is not to be considered as limiting the scope of the embodiments herein.

FIG. 1 illustrates a structure diagram of an embodiment of a dual-frequency and dual-polarization antenna 100 of the present application.

The dual-frequency and dual-polarization antenna 100 comprises a first substrate 10, a first polarization antenna 20, a second polarization antenna 30, and a second substrate 40. The first polarization antenna 20 comprises a first radiation portion 21 (shown in FIG. 3) and a second radiation portion 22 (shown in FIG. 3). The first radiation portion 21 is disposed on a first surface of the first substrate 10, and the second radiation portion 22 is disposed on a second surface of the first substrate 10.

Figure 3:
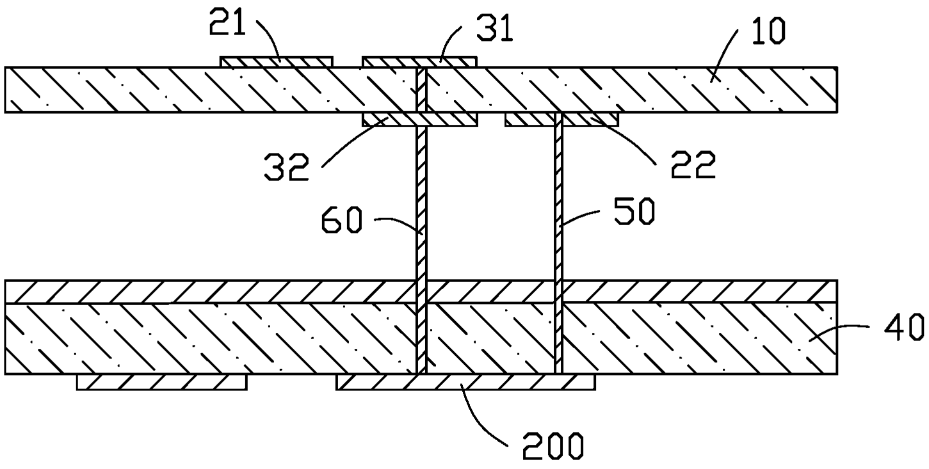
FIG. 3 is a diagram of a transceiver of the dual-frequency and dual-polarization antenna of FIG. 1.

The second polarization antenna 30 comprises a third radiation portion 31 (shown in FIG. 3) and a fourth radiation portion 32 (shown in FIG. 3). The third radiation portion 31 is disposed on the first surface of the first substrate 10, and the fourth radiation portion 32 is disposed on the second surface of the first substrate 10. The second substrate 40 is located in a side of the second surface of the first substrate 10, and a surface of the second substrate 40 close to the first substrate 10 is a copper-clad surface. In layout, the first polarization antenna 20 and the second polarization antenna 30 are orthogonal to each other in the first substrate 10.

For example, a layout direction of the first polarization antenna 20 is a horizontal direction, a layout direction of the second polarization antenna 30 is a vertical direction. The first polarization antenna 20 and the second polarization antenna 30 are orthogonally arranged 90 degrees apart, so that the dual-frequency and dual-polarization antenna 100 can have vertical and horizontal performance at the same time, reducing the number of antennas and feed loss while matching antenna isolation requirement. The dual-frequency and dual-polarization antenna 100 can simultaneously perform a dual working mode of signal transmitting and signal receiving. The surface of the second substrate 40 close to the first substrate 10 is a copper-clad surface, the second substrate 40 can work as a reflecting board, increasing broadside antenna gain.

In one embodiment, the second substrate 40 can be grounded as a barrier between the dual-frequency and dual-polarization antenna 100 and a transceiver 200 (shown in FIG. 3), to shield the dual-frequency and dual-polarization antenna 100 against noise.

Figure 2:
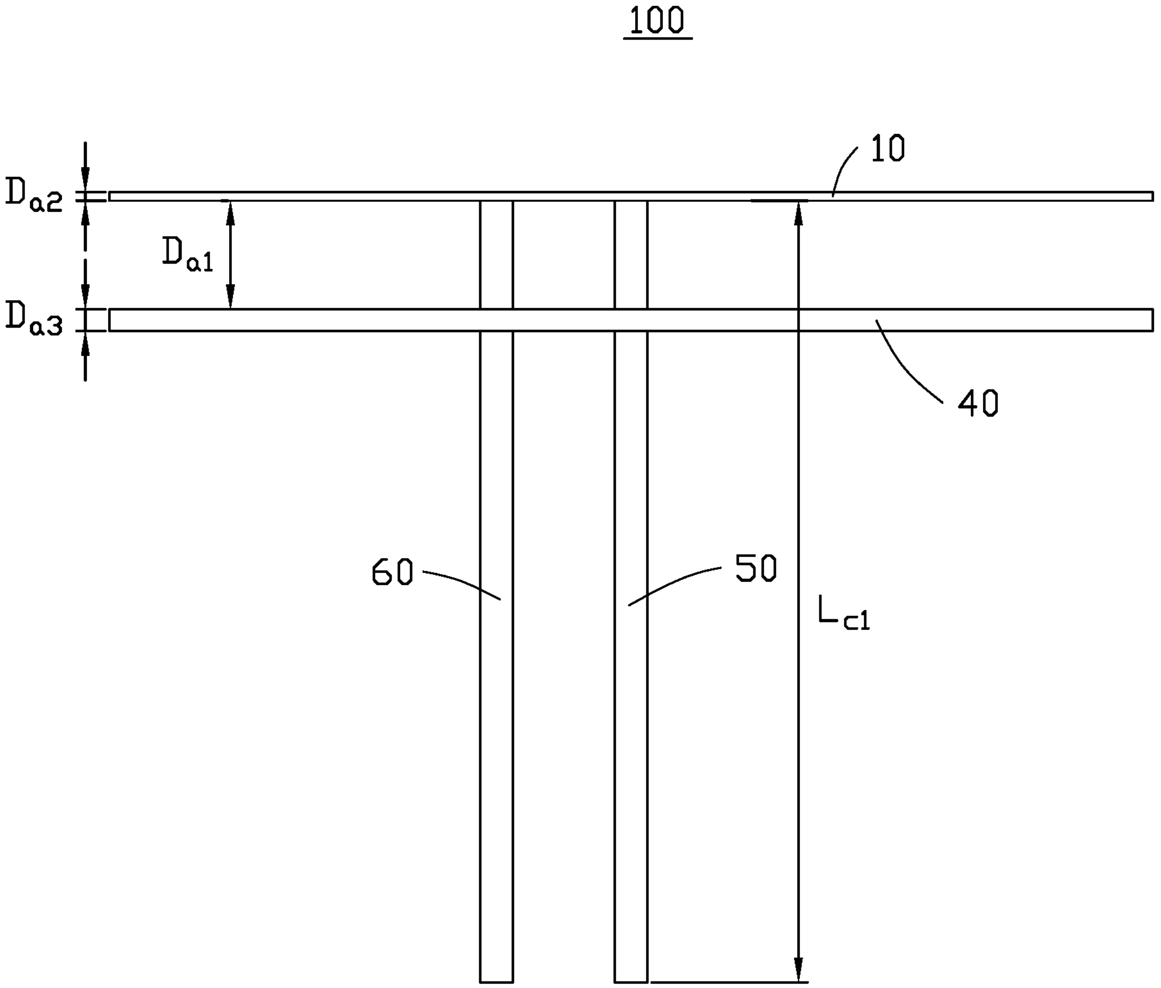
FIG. 2 is a side view of the dual-frequency and dual-polarization antenna of FIG. 1.

Referring to FIG. 2, in one embodiment, the dual-frequency and dual-polarization antenna 100 can further comprise a first radio frequency (RF) coaxial cable 50 and a second RF coaxial cable 60. The first RF coaxial cable 50 is electrically connected to the second radiation portion 22, and the second RF coaxial cable 60 is electrically connected to the fourth radiation portion 32. For example, the first RF coaxial cable 50 and the second RF coaxial cable 60 can be electrically connected to an antenna from directly below. The second substrate 40 can also be configured as a circuit board of the transceiver 200, integrating the transceiver 200 into the dual-frequency and dual-polarization antenna 100 and reducing loss of the transceiver 200 when feeding millimeter-wave signals to the dual-frequency and dual-polarization antenna 100.

In one embodiment, the second substrate 40 comprises a first via 41 and a second via 42, the first RF coaxial cable 50 passes through the first via 41, and the second RF coaxial cable 60 passes through the second via 42. Then, the first RF coaxial cable 50 and the second RF coaxial cable 60 can pass through the second substrate 40 through the first via 41 and the second via 42, to reduce feed loss. The first RF coaxial cable 50 and the second RF coaxial cable 60 can be RF microwave coaxial cables.

Figure 4:
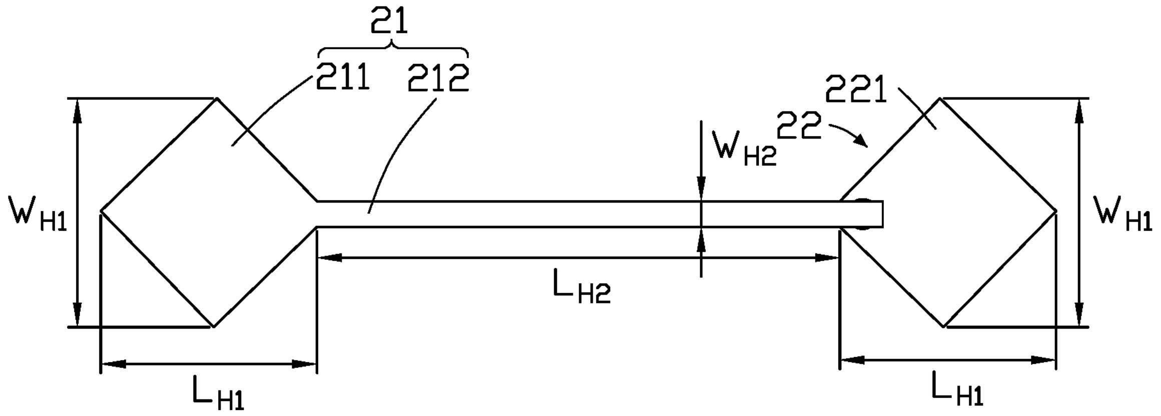
FIG. 4 is a structure diagram of a first polarization antenna of the dual-frequency and dual-polarization antenna of FIG. 1.
Figure 5:
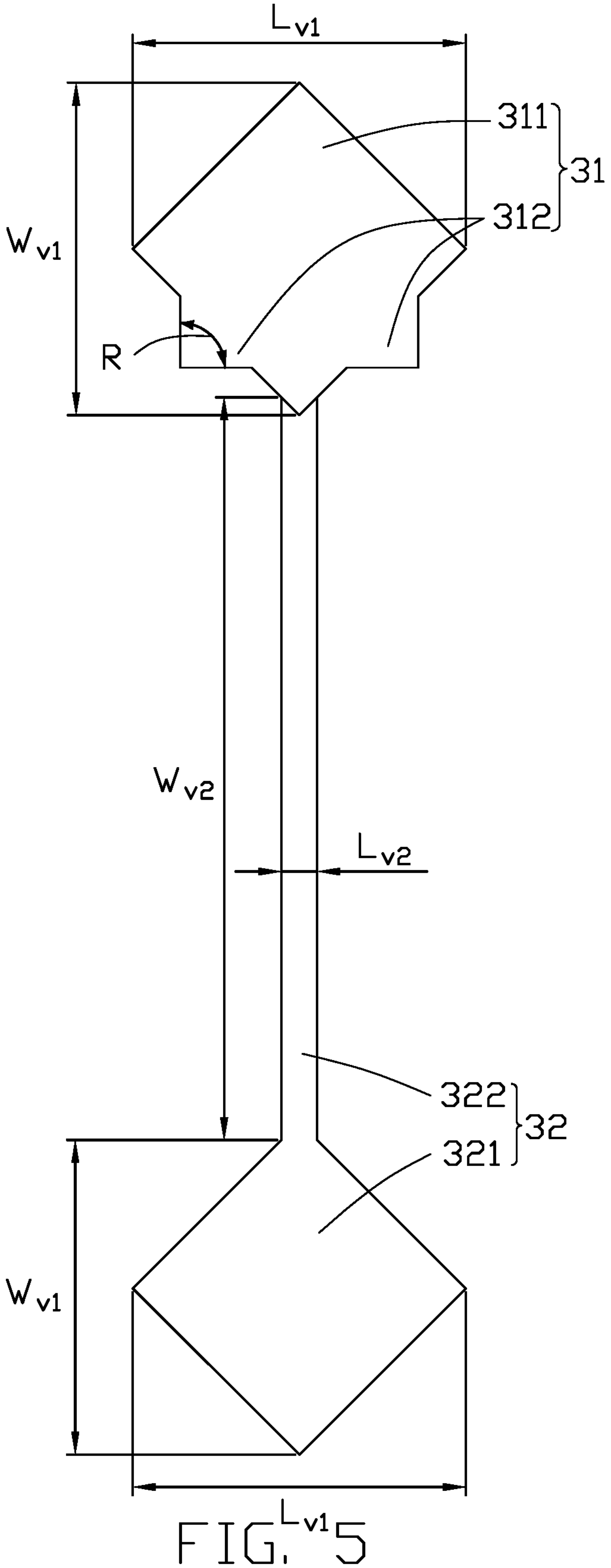
FIG. 5 is a structure diagram of a second polarization antenna of the dual-frequency and dual-polarization antenna of FIG. 1.

In one embodiment, referring to FIGS. 4 and 5, the first radiation portion 21 can comprise a first square portion 211 and a first rectangular portion 212. The first rectangular portion 212 is extended from a corner of the first square portion 211. The second radiation portion 22 comprises a second square portion 221.

In one embodiment, the third radiation portion 31 comprises a third square portion 311, and the fourth radiation portion 32 comprises a fourth square portion 321 and a second rectangular portion 322. The second rectangular portion 322 is extended from a corner of the fourth square portion 321. Sizes of the first square portion 211, the second square portion 221, the third square portion 311, and the fourth square portion 321 may be the same, and all have a diagonal length of 5 mm. Sizes of the first rectangular portion 212 and the second rectangular portion 322 may be the same, and both have a length of 7 mm and a width of 0.7 mm.

In one embodiment, the third radiation portion 31 further comprises a convex portion 312, and the convex portion 312 is disposed on a side of the third radiation portion 31 close to the fourth radiation portion 32. In this embodiment, the third radiation portion 31 can comprise two convex portions 312, and the two convex portions 312 are respectively disposed on a middle portion of two sides of the third radiation portion 31 close to the fourth radiation portion 32. By so arranging the convex portion 312, a path of current passing through the third radiation portion 31 is changed, and a bandwidth received by the second polarization antenna 30 can be adjusted.

In one embodiment, the convex portion 312 is an isosceles right triangle, a long side of the convex portion 312 is attached to a side of the third radiation portion 31, and a length of the long side of the convex portion 312 is less than a side length of the third radiation portion 31. In this embodiment, two convex portions 312 are included, lengths of short sides of the convex portion 312 are 1 mm, and the two convex portions 312 are respectively disposed on the middle portions of two sides of the third radiation portion 31 close to the fourth radiation portion 32.

Referring to FIG. 3, in one embodiment, the first RF coaxial cable 50 and the second RF coaxial cable 60 are electrically connected to the transceiver 200. The transceiver 200 is disposed on a surface of the second substrate 40 away from the first substrate 10.

In one embodiment, a distance between the first substrate 10 and the second substrate 40 is 2.5 mm. For a 5G band wireless signal of 28 GHz, a wavelength of the 5G band wireless signal in air is about 10 mm, the distance between the first substrate 10 and the second substrate 40 is defined as 2.5 mm, and the distance between the first substrate 10 and the second substrate 40 is equal to a quarter of the wavelength. Then, a phase angle of reflected wave of antenna can be the same to converge the waves, and a wave beam of the converged waves can radiate to a broad direction.

Referring to FIGS. 1, 2, 4, and 5, a size specification of the dual-frequency and dual-polarization antenna 100 is shown in Table 1 (unit: mm).

TABLE 1

| $W_{H1}$ | $L_{H1}$ | $L_{H2}$ | $W_{H2}$ | $W_{v1}$ |
|---|---|---|---|---|
| 5 | 5 | 7 | 0.7 | 6 |
| $L_{v1}$ | $L_{v2}$ | $W_{v2}$ | R | $L_1$ |
| 6 | 0.7 | 7 | 90° | 25 |
| $W_1$ | $D_{a1}$ | $D_{a2}$ | $D_{a3}$ | $L_{c1}$ |
| 23 | 2.5 | 0.5 | 0.8 | 30 |

Figure 6:
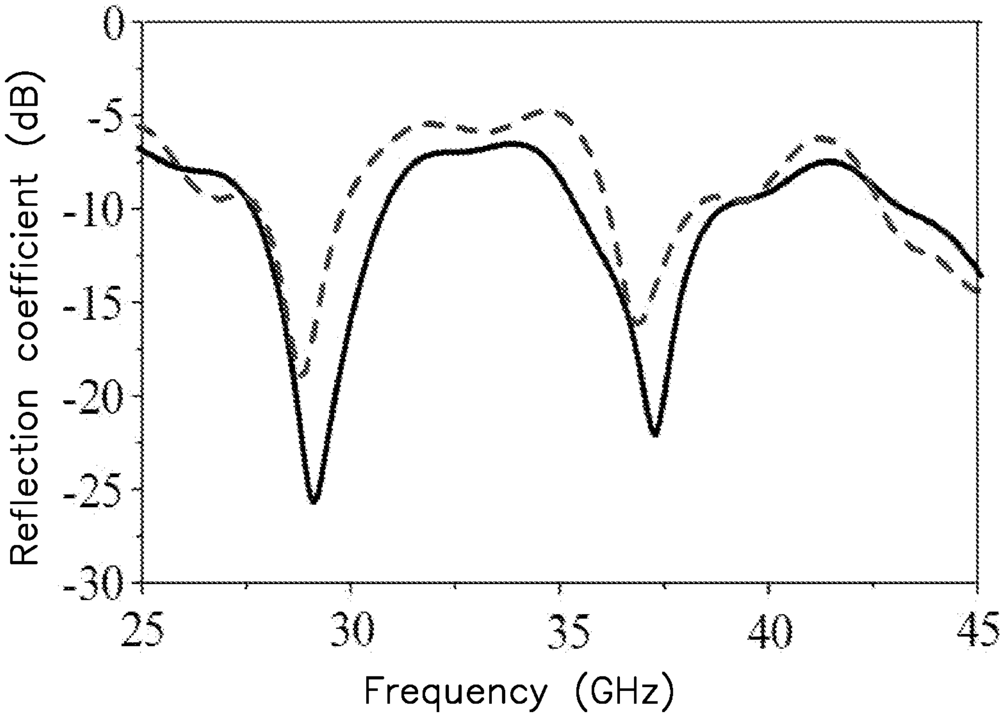
FIG. 6 is a reflection coefficient measurement diagram of the first polarization antenna of the dual-frequency and dual-polarization antenna of FIG. 1.

FIG. 6 shows a reflection coefficient measurement diagram of the first polarization antenna 20 of an embodiment, a solid line of FIG. 6 is a simulated value, and a dashed line of FIG. 6 is a measured value.

Figure 7:
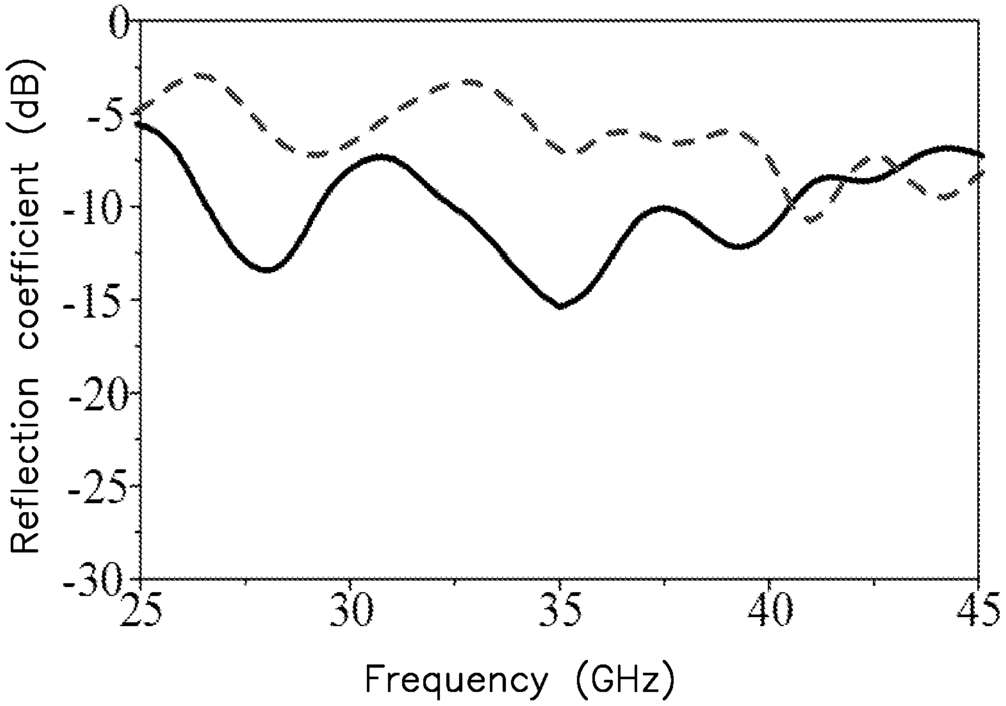
FIG. 7 is a reflection coefficient measurement diagram of the second polarization antenna of the dual-frequency and dual-polarization antenna of FIG. 1.

FIG. 7 shows a reflection coefficient measurement diagram of the second polarization antenna 30 of an embodiment, a solid line of FIG. 7 is a simulated value, and a dashed line of FIG. 7 is a measured value.

Figure 8:
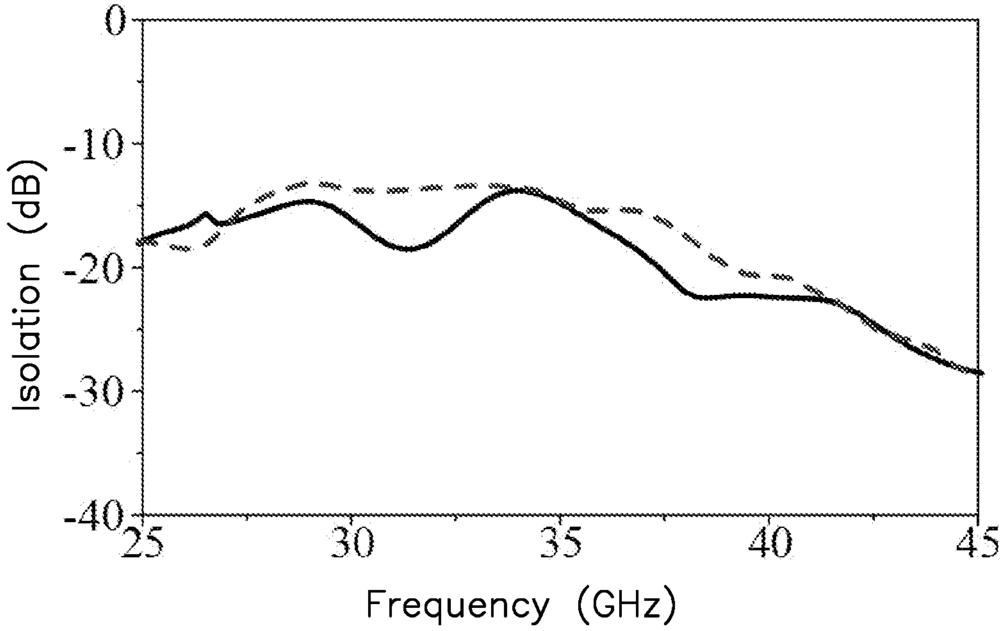
FIG. 8 is an isolation measurement diagram of the dual-frequency and dual-polarization antenna of FIG. 1.

FIG. 8 shows an isolation measurement diagram between the first polarization antenna 20 and the second polarization antenna 30 of an embodiment, a solid line of FIG. 8 is a simulated value, and a dashed line of FIG. 8 is a measured value.

Figure 9:
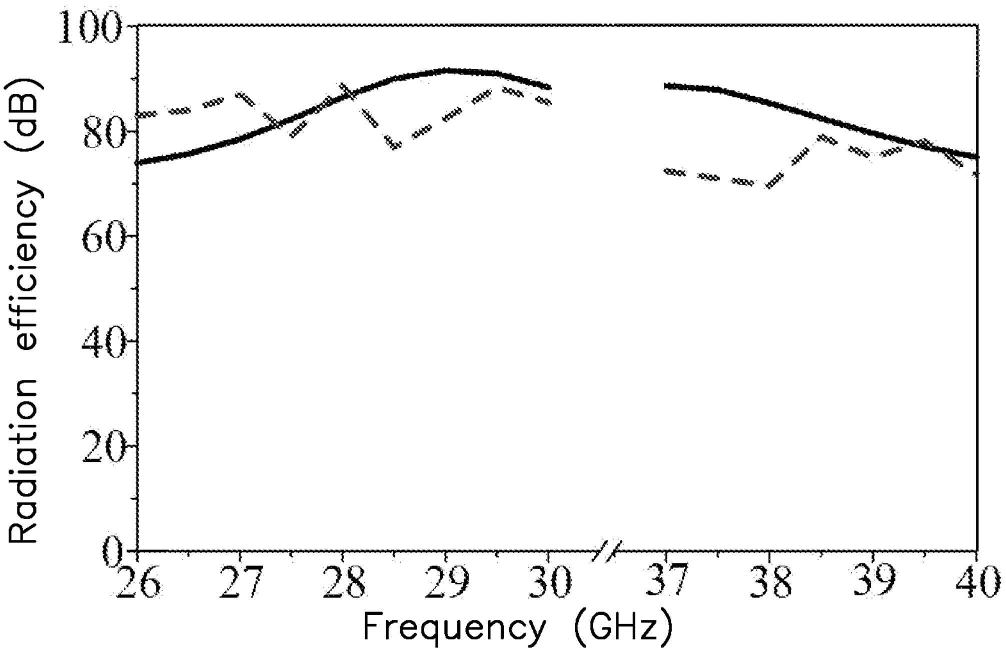
FIG. 9 is a radiation efficiency measurement diagram of the first polarization antenna of the dual-frequency and dual-polarization antenna of FIG. 1.

FIG. 9 shows a radiation efficiency measurement diagram of the first polarization antenna 20 of an embodiment, a solid line of FIG. 9 is a simulated value, and a dashed line of FIG. 9 is a measured value. A simulated value of radiation efficiency at 28 GHz is 86.5%, and a measured value is 88.8%. A simulated value of radiation efficiency at 38 GHz is 85.4%, and a measured value is 69.7%.

Figure 10:
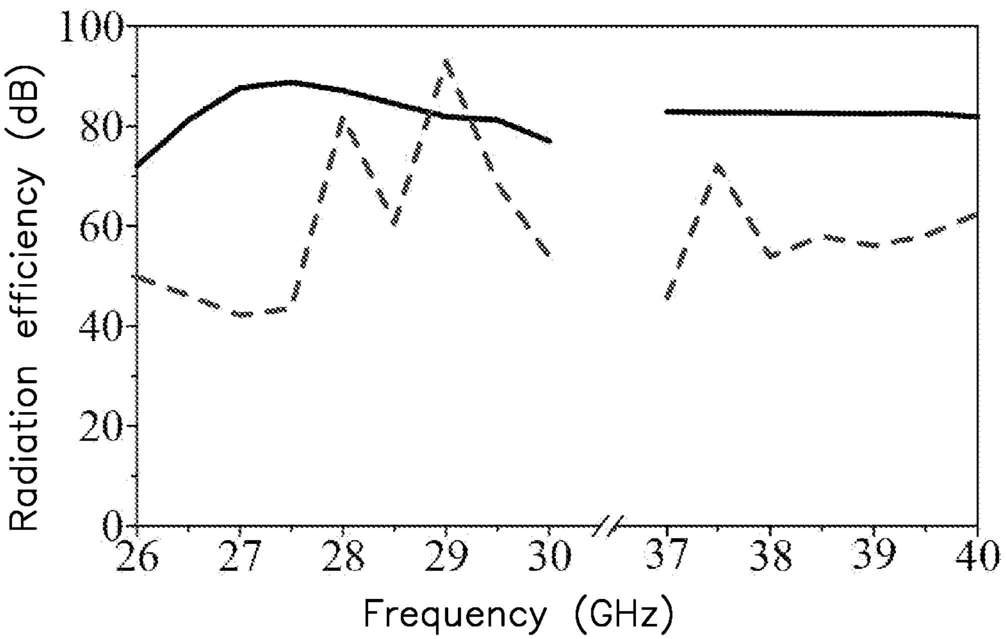
FIG. 10 is a radiation efficiency measurement diagram of the second polarization antenna of the dual-frequency and dual-polarization antenna of FIG. 1.

Referring to FIG. 10, a radiation efficiency measurement diagram of the second polarization antenna 30 of an embodiment is shown, a solid line of FIG. 10 is a simulated value, and a dashed line of FIG. 10 is a measured value. A simulated value of radiation efficiency at 28 GHz is 87.1%, and a measured value is 82.0%. A simulated value of radiation efficiency at 38 GHz is 82.7%, and a measured value is 53.9%.

The present application also provides an electronic device, the electronic device comprises the dual-frequency and dual-polarization antenna 100 as described above. The electronic device can be a signal base station, a mobile device, a smart device, etc.

In several embodiments provided by the present application, it should be understood that antenna structure may be implemented in other ways.

In addition, the functions in various embodiments of the present application may be integrated in a single structure.

However, it will be understood by those of ordinary skill in the art that the embodiments described herein can be practiced without these specific details, and the present application can be implemented in other specific forms without departing from a spirit or basic characteristics of the present application. Therefore, for every point of view, embodiments should be regarded as exemplary and non-limiting. In addition, it is obvious that the word "comprise" does not exclude other or steps, and the singular does not exclude the plural.

The description is not to be considered as limiting the scope of the embodiments described herein, some changes or adjustments can be made in the detail according to an actual requirement, and these changes and adjustments should fall in the scope of the present application.

What is claimed is:

1. A dual-frequency and dual-polarization antenna, comprising:

a first substrate;

a first polarization antenna comprising a first radiation portion and a second radiation portion, wherein the first radiation portion is disposed on a first surface of the first substrate, and the second radiation portion is disposed on a second surface of the first substrate;

a second polarization antenna comprising a third radiation portion and a fourth radiation portion, wherein the third radiation portion is disposed on the first surface of the first substrate, and the fourth radiation portion is disposed on the second surface of the first substrate;

a second substrate located in a side of the second surface of the first substrate, wherein a surface of the second substrate close to the first substrate is a copper-clad surface; and wherein layout directions of the first polarization antenna and the second polarization antenna are orthogonal in the first substrate.

2. The dual-frequency and dual-polarization antenna of claim 1, further comprising a first radio frequency (RF) coaxial cable and a second RF coaxial cable, wherein the first RF coaxial cable is electrically connected to the second radiation portion, and the second RF coaxial cable is electrically connected to the fourth radiation portion.

3. The dual-frequency and dual-polarization antenna of claim 2, wherein the second substrate comprises a first via and a second via, the first RF coaxial cable passes through the first via, and the second RF coaxial cable passes through the second via.

4. The dual-frequency and dual-polarization antenna of claim 1, wherein the first radiation portion comprises a first square portion and a first rectangular portion extended from a corner of the first square portion, and the second radiation portion comprises a second square portion.

5. The dual-frequency and dual-polarization antenna of claim 1, wherein the third radiation portion comprises a third square portion, and the fourth radiation portion comprises a fourth square portion and a second rectangular portion extended from a corner of the fourth square portion.

6. The dual-frequency and dual-polarization antenna of claim 5, wherein the third radiation portion comprises a convex portion, and the convex portion is disposed on a side of the third radiation portion close to the fourth radiation portion.

7. The dual-frequency and dual-polarization antenna of claim 6, wherein the convex portion is an isosceles right triangle, a long side of the convex portion is attached to a side of the third radiation portion, and a length of the long side of the convex portion is less than a side length of the third radiation portion.

8. The dual-frequency and dual-polarization antenna of claim 2, wherein the first RF coaxial cable and the second RF coaxial cable are electrically connected to a transceiver, and the transceiver is disposed on a surface of the second substrate away from the first substrate.

9. The dual-frequency and dual-polarization antenna of claim 1, wherein a distance between the first substrate and the second substrate is 2.5 mm.

10. An electronic device, comprising a dual-frequency and dual-polarization antenna, wherein the dual-frequency and dual-polarization antenna comprises:

a first substrate;

a first polarization antenna comprising a first radiation portion and a second radiation portion, wherein the first radiation portion is disposed on a first surface of the first substrate, and the second radiation portion is disposed on a second surface of the first substrate;

a second polarization antenna comprising a third radiation portion and a fourth radiation portion, wherein the third radiation portion is disposed on the first surface of the first substrate, and the fourth radiation portion is disposed on the second surface of the first substrate;

a second substrate located in a side of the second surface of the first substrate, wherein a surface of the second substrate close to the first substrate is a copper-clad surface; and wherein layout directions of the first polarization antenna and the second polarization antenna are orthogonal in the first substrate.

11. The electronic device of claim 10, wherein the dual-frequency and dual-polarization antenna further comprises a first radio frequency (RF) coaxial cable and a second RF coaxial cable, the first RF coaxial cable is electrically connected to the second radiation portion, and the second RF coaxial cable is electrically connected to the fourth radiation portion.

12. The electronic device of claim 11, wherein the second substrate comprises a first via and a second via, the first RF coaxial cable passes through the first via, and the second RF coaxial cable passes through the second via.

13. The electronic device of claim 10, wherein the first radiation portion comprises a first square portion and a first rectangular portion extended from a corner of the first square portion, and the second radiation portion comprises a second square portion.

14. The electronic device of claim 10, wherein the third radiation portion comprises a third square portion, and the fourth radiation portion comprises a fourth square portion and a second rectangular portion extended from a corner of the fourth square portion.

15. The electronic device of claim 14, wherein the third radiation portion comprises a convex portion, and the convex portion is disposed on a side of the third radiation portion close to the fourth radiation portion.

16. The electronic device of claim 15, wherein the convex portion is an isosceles right triangle, a long side of the convex portion is attached to a side of the third radiation portion, and a length of the long side of the convex portion is less than a side length of the third radiation portion.

17. The electronic device of claim 11, wherein the first RF coaxial cable and the second RF coaxial cable are electrically connected to a transceiver, and the transceiver is disposed on a surface of the second substrate away from the first substrate.

18. The electronic device of claim 10, wherein a distance between the first substrate and the second substrate is 2.5 mm.

* * * * *